US00RE42116E

(19) United States
(12) Reissued Patent
Leung et al.

(10) Patent Number: US RE42,116 E
(45) Date of Reissued Patent: Feb. 8, 2011

(54) LOW DROPOUT REGULATOR CAPABLE OF ON-CHIP IMPLEMENTATION

(75) Inventors: Ka Nang Leung, Hong Kong (CN); Kwok Tai Philip Mok, Hong Kong (CN)

(73) Assignee: The Hong Kong University of Science and Technology, Hong Kong (HK)

(21) Appl. No.: 12/425,317

(22) Filed: Apr. 16, 2009

Related U.S. Patent Documents

Reissue of:
(64) Patent No.: 7,205,827
Issued: Apr. 17, 2007
Appl. No.: 10/739,115
Filed: Dec. 19, 2003

U.S. Applications:
(60) Provisional application No. 60/435,357, filed on Dec. 23, 2002.

(51) Int. Cl.
*G05F 1/10* (2006.01)
*G05F 3/02* (2006.01)

(52) U.S. Cl. ..... 327/540; 323/280; 323/316
(58) Field of Classification Search ..... 327/538, 327/540, 541, 543; 323/280–282, 316
See application file for complete search history.

(56) References Cited

U.S. PATENT DOCUMENTS 5,861,736 A * 1/1999 Corsi et al. ..... 32/273
6,104,179 A * 8/2000 Yukawa ..... 323/316
6,208,206 B1 3/2001 Leung et al.
6,300,749 B1 10/2001 Castelli et al.
6,304,131 B1 10/2001 Huggins et al.
6,369,554 B1 * 4/2002 Aram ..... 323/282
6,441,680 B1 8/2002 Leung et al.
6,696,869 B1 2/2004 Tan
6,710,583 B2 * 3/2004 Stanescu et al. ..... 323/280
6,819,165 B2 11/2004 Ho et al.

OTHER PUBLICATIONS

Office Action, mailed Dec. 10, 2004, for U.S. Appl. No. 10/739,115, 5 pages.
Final Office Action, mailed Apr. 8, 2005, for U.S. Appl. No. 10/739,115, 5 pages.
Advisory Action, mailed Jul. 18, 2005, for U.S. Appl. No. 10/739,115, 3 pages.
Office Action, mailed Jan. 12, 2006, for U.S. Appl. No. 10/739,115, 6 pages.
Final Office Action, mailed Apr. 20, 2006, for U.S. Appl. No. 10/739,115, 6 pages.
Notice of Allowability, mailed Feb. 28, 2007, for U.S. Appl. No. 10/739,115, 2 pages.

(Continued)

*Primary Examiner*—Quan Tra
(74) *Attorney, Agent, or Firm*—Schwabe, Williamson & Wyatt

(57) ABSTRACT

A low-dropout regulator comprises a high-gain error amplifier having a differential input stage and a single-ended output, a high-swing high-positive-gain second stage with input connecting to the output of the error amplifier and a single-ended output, a p-type MOS transistor with gate terminal connecting to the output of the second stage, source terminal connecting to the supply voltage, and drain terminal to the output of the low-dropout regulator. A first-order high-pass feedback network connects the output of the low-dropout regulator and the positive input of the error amplifier, and a damping-factor-control means comprising a negative gain stage with a feedback capacitor connects the input and output of this gain stage. A capacitor is connected between the output of the error amplifier and the output of the low-dropout regulator, while a voltage reference connects to the negative input of the error amplifier. The regulator does not require an off-chip capacitor for stability and has improved load transient response and power supply rejection ratio.

38 Claims, 6 Drawing Sheets

OTHER PUBLICATIONS

Gabriel A. Rincon–Mora, "Active Capacitor Multiplier in Miller–Compensated Circuits", IEEE Transactions on Solid–State Circuits, 2000, pp. 26–32, vol. 35, No. 1.
Microelectronic Circuits, Sedra et al., third edition, p. 456, 1991.
Microelectronic Circuits, Sedra et al., third edition, p. 456, 1991. Gabriel A. Rincon–Mora, "Active Capacitor Multiplier in Miller–Compensated Circuits", IEEE Transactions on Solid–State Circuits, 2000, pp. 26–32, vol. 35, No. 1.
Gabriel A. Rincon–Mora et al., Optimized Frequency–Shaping Circuit Topologies for LDO's, IEEE Transactions on Circuits and Systems–II: Analog and Digital Signal Processing, 1998, pp. 703–708, vol. 45, No. 6.

Gabriel A. Rincon–Mora et al., "A Low–Voltage, Low Quiescent Current, Low Drop–Out Regulator", IEEE Journal of Solid–State Circuits, 1998, pp. 36–44, vol. 33, No. 1.

Ka Nang Leung et al., "Analysis of Multistage Amplifier–Frequency Compensation", IEEE Transactions on Circuits and Systems–I: Fundamental Theory and Applications, 2001, pp. 1041–1056, vol. 48, No. 9.

Ka Nang Leung et al., "Three–Stage Large Capacitive Load Amplifier with Damping–Factor–Control Frequency Compensation", IEEE Transactions on Solid–State Circuits, 2000, pp. 221–230, vol. 35, No. 2.

* cited by examiner

LOW DROPOUT REGULATOR CAPABLE OF ON-CHIP IMPLEMENTATION

Matter enclosed in heavy brackets [ ] appears in the original patent but forms no part of this reissue specification; matter printed in italics indicates the additions made by reissue.

FIELD OF THE INVENTION

This invention relates to an internally compensated low-dropout regulator, and in particular to such a regulator that does not necessarily require an off-chip capacitor for stability, to improve both load transient response and power supply rejection ratio.

BACKGROUND OF THE INVENTION

Power management is necessary to reduce standby power consumption of low-power portable applications such as mobile phones and personal digital assistants (PDAs). A low-dropout regulator (LDO) is a type of voltage regulator that is widely utilized in power management integrated circuits. They are especially suitable for applications that require a low-noise and precision supply voltage with minimum off-chip components. With the rapid development of system-on-chip designs, there is a growing trend towards power-management integration. On-chip and local LDOs are used to power up system sub-blocks individually and this can significantly reduce cross talk, improve voltage regulation and eliminate voltage spikes. However, an off-chip capacitor, which provides LDO stability and good load transient response, cannot be eliminated in conventional LDO designs based on pole-zero cancellation. This is the main obstacle to the full integration of LDOs in system-on-chip designs. Though there are some LDO designs with internal compensation, the frequency and transient performances are sacrificed as tradeoffs.

PRIOR ART

A conventional CMOS LDO, as shown in FIG. 1, comprises an error amplifier (EA), a voltage buffer (VB), a power p-type MOS (Metal-Oxide-Semiconductor) transistor operating in saturation region, a voltage reference providing a reference voltage ($V_{REF}$), feedback resistors $R_{F1}$ and $R_{F2}$, an input capacitor $C_{IN}$ and an output capacitor $C_{OUT}$. This LDO circuit can be easily integrated in many integrated-circuit technologies but the off-chip output capacitor is necessary for stable operation and dynamic performances. Frequency compensation of the LDO is achieved by pole-zero cancellation, as disclosed in G. A. Rincon-Mora and P. E. Allen, "A Low-Voltage, Low Quiescent Current, Low Drop-Out Regulator," IEEE Journal of Solid-State Circuits, vol. 33, no. 1, pp.36–44, January 1998 and in G. A. Rincon-Mora and P. E. Allen, "Optimized Frequency-Shaping Circuit Topologies for LDO's," IEEE Transaction on Circuit and Systems II, vol. 45, no. 6, pp.703–708, June 1998. Some advanced LDOs utilize "pole-splitting" effect, for example, as disclosed in G. A. Rincon-Mora, "Active Multiplier in Miller-Compensated Circuits," IEEE Journal of Solid-State Circuits, vol. 35, no. 1, pp.26–32, January 2000 and in U.S. Pat. No. 6,304,131. However, the off-chip c still required, and the loop-gain bandwidth, which determines the load transient response and power supply rejection ratio, is not sufficient for some high-performance circuits. In fact, the off-chip capacitor provides high LDO performance but is a hinder to system-on-chip design.

SUMMARY OF THE INVENTION

According to the present invention there is provided a circuit of low-dropout regulator comprising an error amplifier, a high-gain second-stage amplifier, a power p-type MOS transistor operating in either linear or saturation region, a first-order high-pass feedback network, a frequency compensation circuitry implementing damping-factor-control compensation and a voltage reference.

BRIEF DESCRIPTION OF THE DRAWINGS

An embodiment of the invention will now be described by the way of example and with reference to accompanying drawings, in which.

DETAILED DESCRIPTION OF PREFERRED EMBODIMENT

The present invention provides a low-dropout regulator which is based on the concept of frequency compensation of a three-stage amplifier with a pole-splitting effect. The theory of existing frequency compensation topologies of multi-stage amplifier has been disclosed in K. N. Leung and P. K. T. Mok, "Analysis of Multi-Stage Amplifier-Frequency Compensation," IEEE Transactions on Circuits and Systems I, vol. 48, no. 9, pp.1041–1056, September 2001. In fact, the loop-gain bandwidth, which relates significantly to the response time of LDO, is controlled by the associated frequency compensation scheme.

Figure 1:
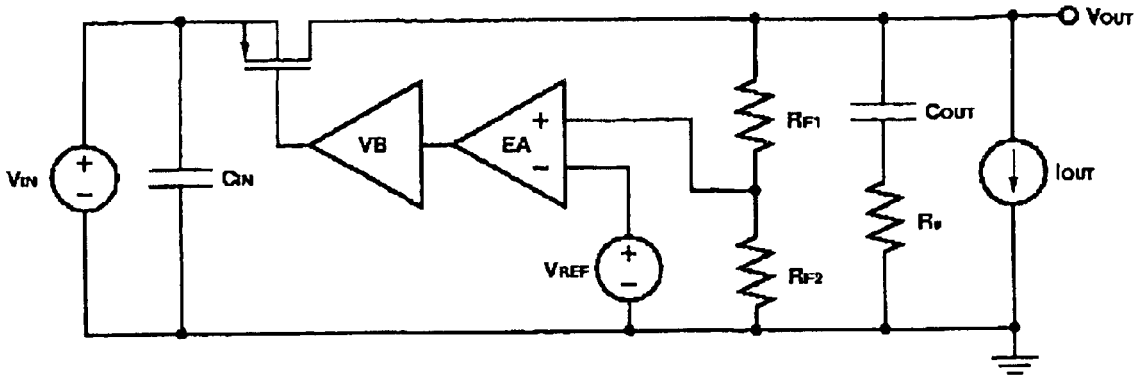
FIG. 1 Prior Art
FIG. 1 is the block diagram illustrating a generic LDO according to the prior art.
Figure 2:
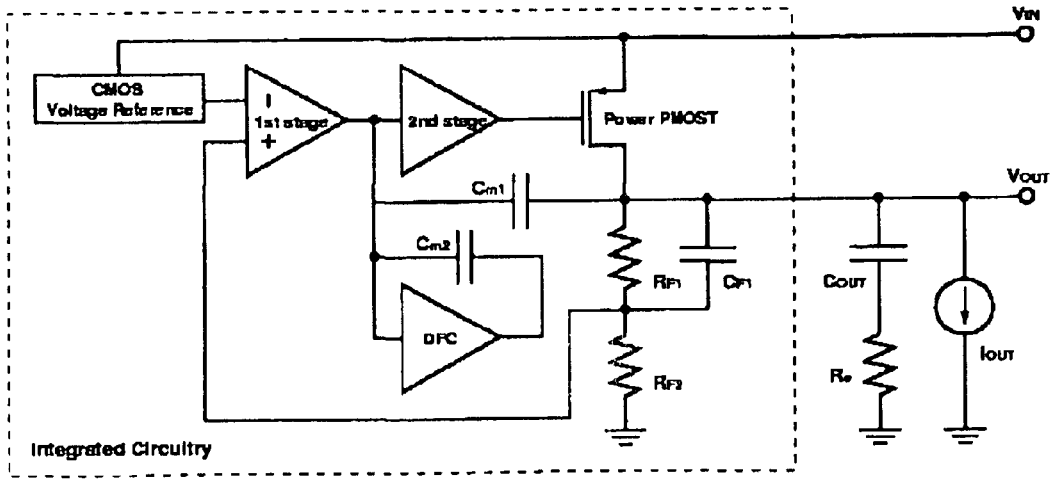
FIG. 2 is the block diagram illustrating the structure of a LDO according to an embodiment of the present invention.

An example of a LDO according to an embodiment of the invention is illustrated in FIG. 2, and the structure of the LDO can be viewed as an amplifier with three gain stages. The first stage is an error amplifier and is used to compare the reference voltage and the feedback scaled output voltage. The second stage functions as a high-swing high-gain stage in common-source configuration, and it boosts the loop gain for high-precision regulated output voltage. The power p-type MOS transistor can be viewed as the third stage, and it can operate in either linear or saturation region. The low-frequency loop gain is high since the first two stages provide a very high signal gain. However, with regard of the LDO stability, it is not preferable as there are three low-frequency poles associated with the LDO. Thus, an advanced frequency compensation technique is needed to make the LDO stable.

The stability of the LDO illustrated in FIG. 2 is achieved by using a damping-factor-control frequency compensation technique. The damping-factor-control means is achieved by an extra gain stage with a feedback capacitor $C_{m2}$. This damping-factor-control block has a transconductance $g_{m4}$ and is connected at the output of the first stage. An additional compensation capacitor $C_{m1}$ is connected between the output of the first stage and the output of the LDO. By using this scheme, the poles of the LDO split. The first pole, which is a function of gain and compensation capacitance $C_{m1}$, locates at a very low frequency while the second and third poles locate at high frequencies. The effect from the second and third poles can be canceled by the left-half-plane zero created by the output capacitor and its electrostatic series resistance as well as another left-half-plane zero generated from the feedback resistive network. The zero from the resistive network is due to the first-order high-pass characteristic. The implementation of this first-order high-pass resistive network is done by a simple potential resistive divider with a capacitor connecting in parallel with the upper resistor. The stability of the LDO according to an embodiment of the invention, as a result, can be achieved in cases both with and without an off-chip capacitor.

The stability of the LDO according to this embodiment of the invention may be considered for two cases: $I_{OUT}=0$ and $I_{OUT}\neq 0$. Define that 1. $g_{m1}$, $g_{m2}$, $g_{mp}$ and $g_{m4}$ are the transconductances of the first gain stage, second gain stage, p-type power MOS transistor and damping-factor-control block, respectively,
2. $R_{o1}$, $R_{o2}$ and $r_{op}$ are the output resistances of the first gain stage, second gain stage and power p-type MOS transistor, respectively, and
3. $C_g$ is the gate capacitance of p-type MOS transistor.

When an off-chip capacitor is connected to the output of the LDO and $I_{OUT}=0$, the transconductance and the output resistance of the power p-type MOS transistor is minimum and maximum, respectively. This is the worst-case stability of the LDO with a damping-factor-control frequency compensation scheme. In this situation, the LDO has a transfer function, which is given by $$T(s)=\frac{T_o\left(1+\frac{s}{z_e}\right)\cdot\left(1+\frac{s}{z_f}\right)}{\left(1+\frac{s}{p_1}\right)\cdot\left[1+s\left(C_{OUT}R_e+\frac{C_gC_{OUT}g_{m4}}{C_{m1}g_{m4}g_{mp}}\right)+s^2\frac{C_gC_{OUT}g_{m4}}{C_{m1}g_{m4}g_{mp}}\right]\cdot\left(1+\frac{s}{p_1}\right)}$$

where $T_o=\left(\frac{R_{F2}}{R_{F1}+R_{F2}}\right)\cdot g_{m1}g_{m2}g_{mp}R_{o1}R_{o2}r_{op}$, $$p_1=\frac{1}{C_{m1}g_{m2}g_{mp}R_{o1}R_{o2}r_{op}},\quad p_f=\frac{1}{C_F\cdot(R_{F1}//R_{F2})},$$

$$z_e=\frac{1}{C_{OUT}R_e}\text{ and }z_f=\frac{1}{C_{F1}R_{F1}}.$$

With the condition $g_{m4}=4g_{m1}$, the complex pole has a damping factor of $1/\sqrt{2}$. Thus, the position of this complex pole is given by $$|p_{2,3}|=4\sqrt{\frac{2g_{m2}g_{mp}}{C_gC_{OUT}}}$$

The effect of $p_{2,3}$ can be canceled by $z_e$ and $z_f$. Since $p_{2,3}$ splits to a high frequency by the DFC compensation scheme, $z_e$ and $z_f$ are at high frequencies. This implies that a low electrostatic series resistance is needed. A better load transient response and power supply rejection ratio can be obtained. Moreover, $p_f$ is designed to be larger than the unity-gain frequency of the loop gain for a good phase margin. Due to the advanced pole-splitting effect by damping-factor-control frequency compensation, the pole frequency of $p_{2,3}$ is high and a wide loop-gain bandwidth can be achieved.

When the load current increases ($I_{OUT}\neq 0$), $g_{mp}$ also increases and the transfer function is rewritten as $$T(s)=\frac{T_o\left(1+\frac{s}{z_f}\right)}{\left(1+\frac{s}{p_1}\right)\cdot\left(1+s\frac{C_g}{g_{m2}g_{mp}R_e}\right)\cdot\left(1+\frac{s}{p_f}\right)}$$

Figure 4:
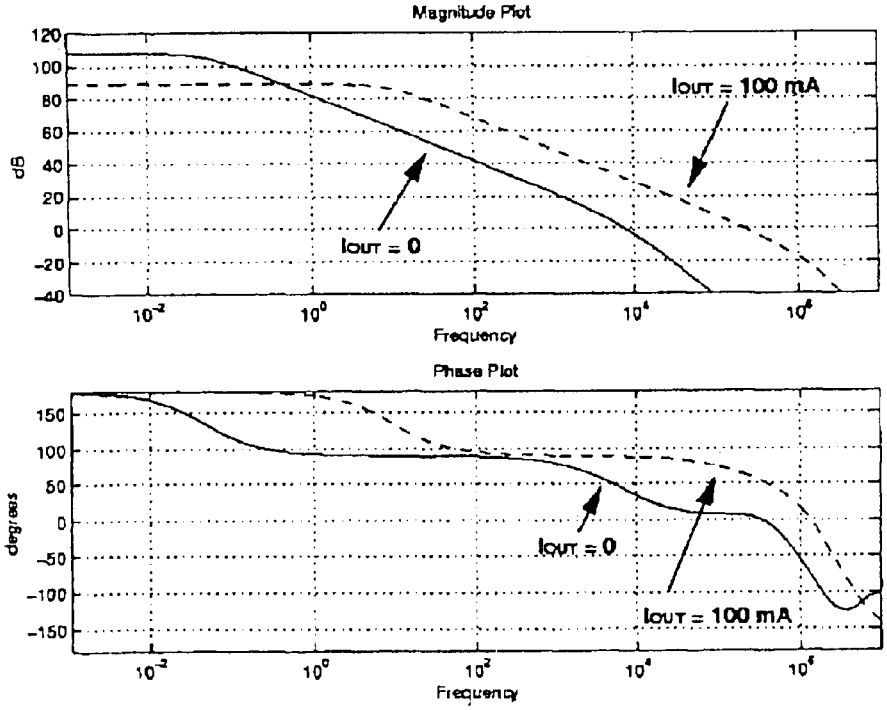
FIG. 4 is the Bode plot of loop gain of the LDO of FIG. 3 with an off-chip capacitor.

It is reduced to a one-zero three-poles system, and a new pole $$p_2=\frac{g_{m2}g_{mp}R_e}{C_g}$$

is created. $z_f$ can be used to cancel $p_2$ to make the system stable. Moreover, the low-frequency loop gain decreases and $p_1$ shifts to a higher frequency since $g_{mp}r_{op}$ is inversely proportional to $\sqrt{I_{OUT}}$. Moreover, it is noted that the electrostatic-series-resistance zero has no effect on this condition since an electrostatic-series-resistance pole is created simultaneously. The simulated Bode plot of loop gain with an off-chip capacitor is shown in FIG. 4.

When the LDO according to this embodiment of the invention is used for an application without using the off-chip capacitor, the LDO is also stable for finite load current range. Under such circumstance, $C_{OUT}=0$ and electrostatic series resistance does not exist. Moreover, the second and third poles are pushed to frequencies that are much higher than the unity-gain frequency of loop gain due to a large $g_{mp}$ with transfer function given by $$T(s)=\frac{T_o\left(1+\frac{s}{z_f}\right)}{\left(1+\frac{s}{p}\right)\cdot\left(1+\frac{s}{p_f}\right)}$$

Figure 5:
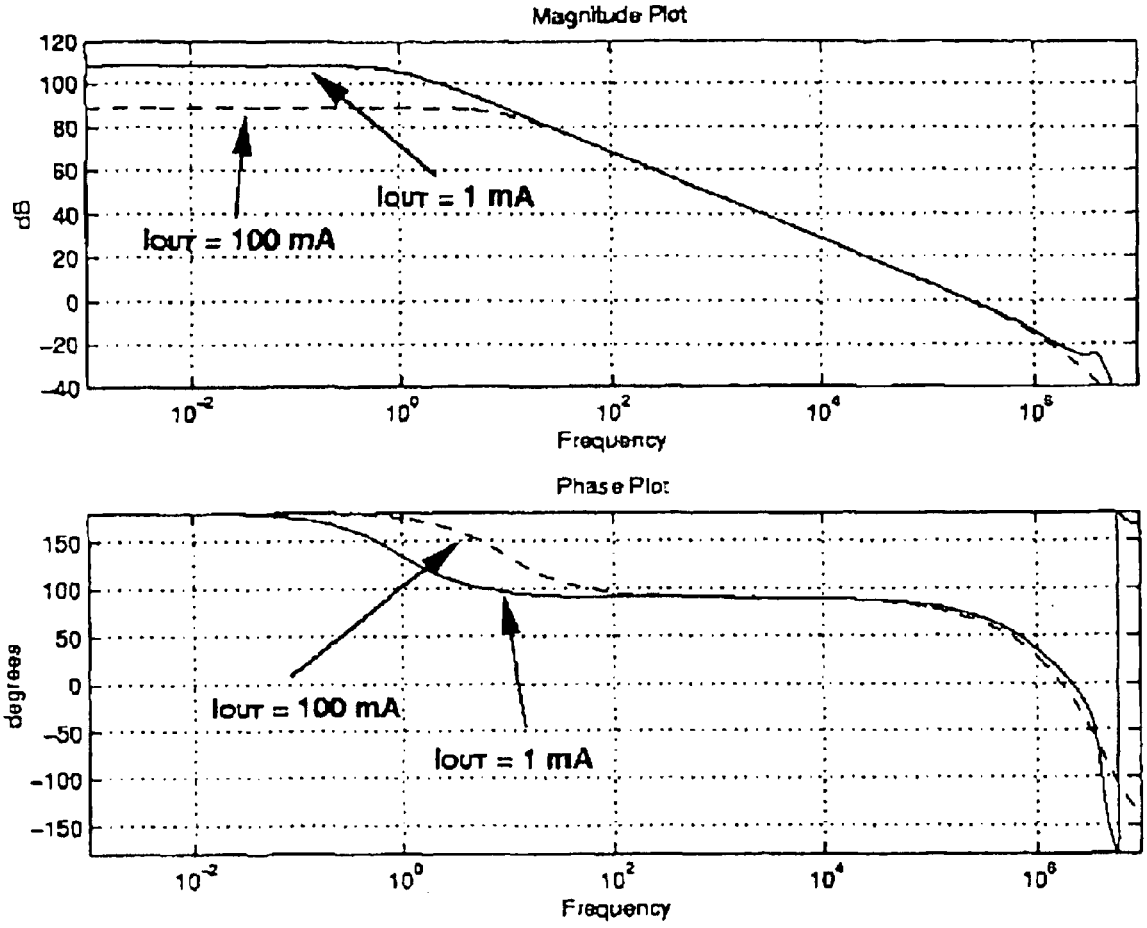
FIG. 5 is the Bode plot of loop gain of the LDO of FIG. 3 without an off-chip capacitor.

Pole-zero cancellation is automatically achieved for $z_f$ and $p_f$, and thus the theoretical phase margin is about 90°. However, parasitic poles and zeros will degrade the phase margin. The simulated Bode plot of loop gain with an off-chip capacitor is shown in FIG. 5.

Figure 3:
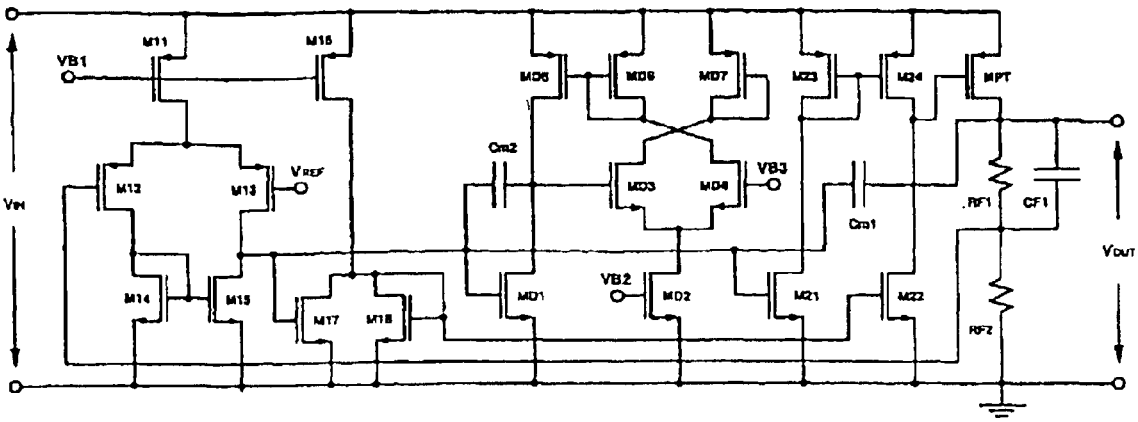
FIG. 3 is the schematic of the LDO according to an embodiment of the present invention.
Figure 6:
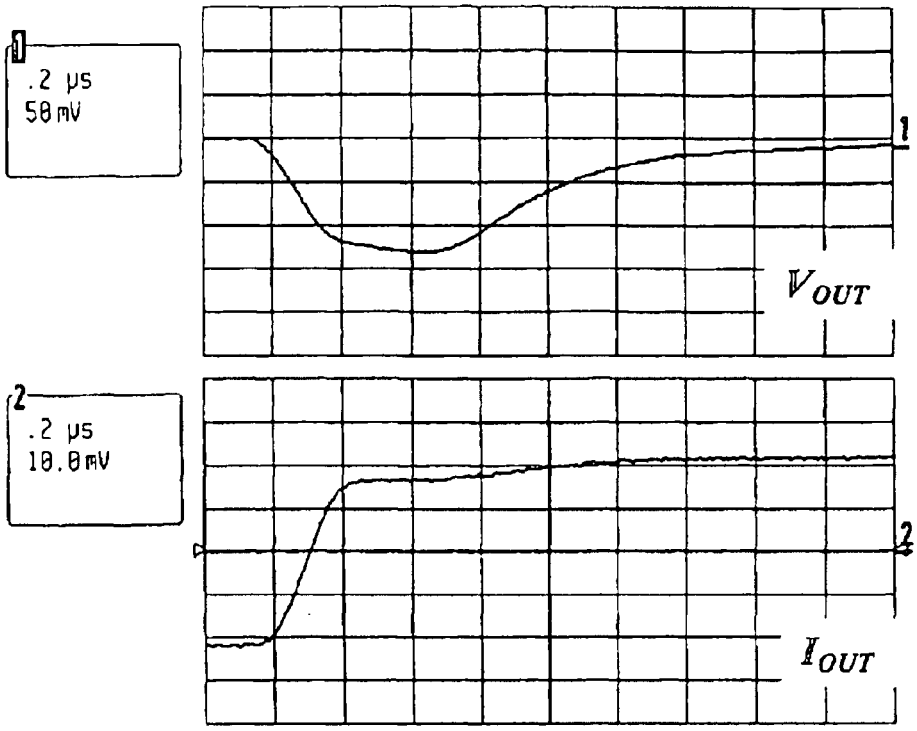
FIG. 6 is the measured load transient response of the LDO of FIG. 3 with an off-chip capacitor.
Figure 7:
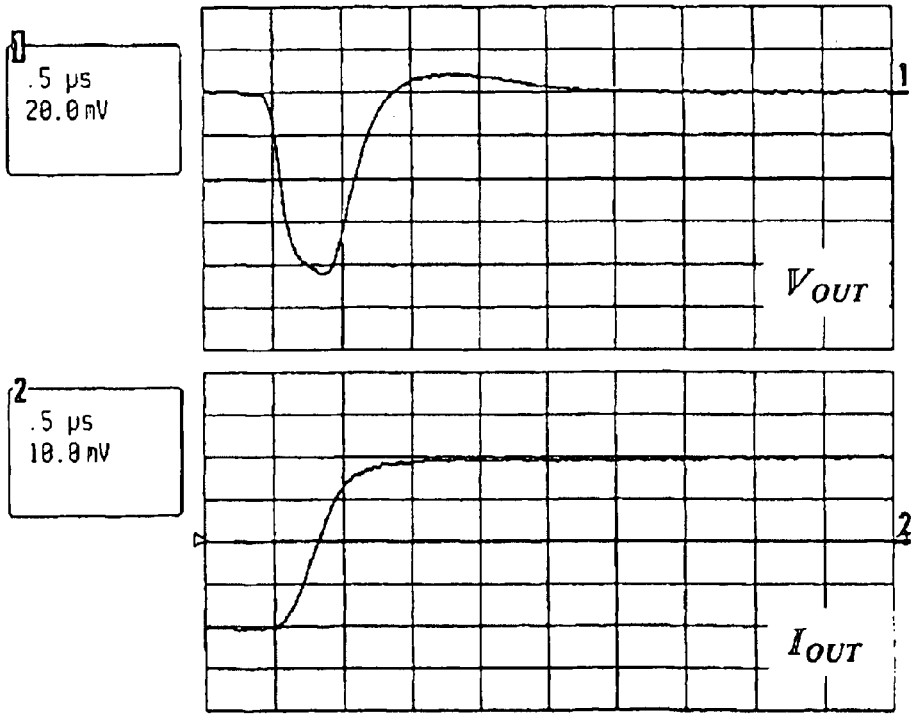
FIG. 7 is the measured load transient response of the LDO of FIG. 3 without an off-chip capacitor.
Figure 8:
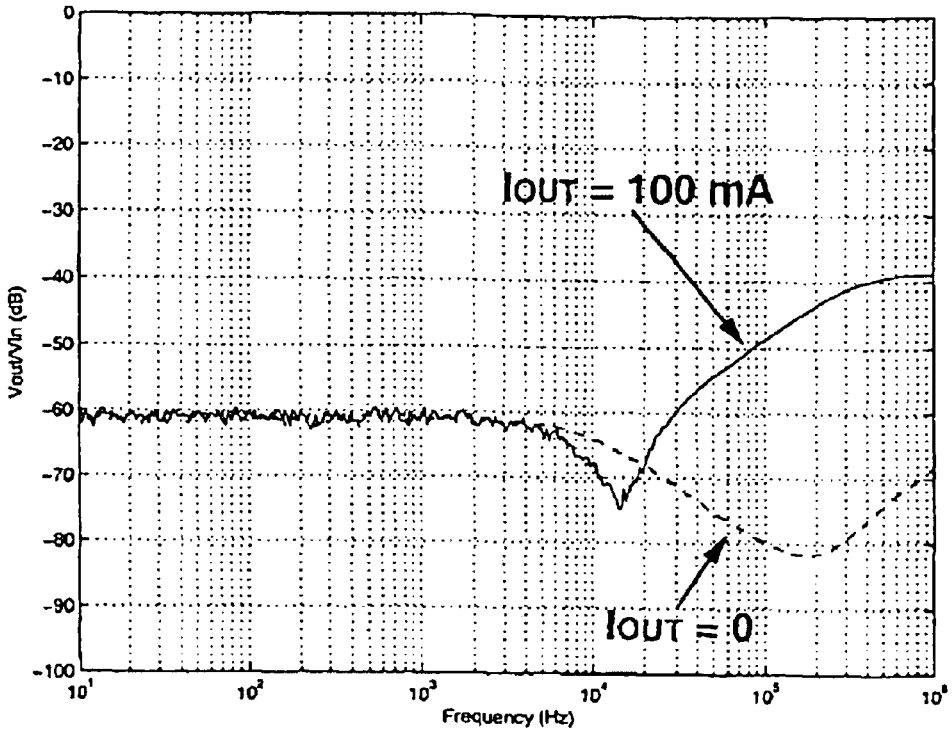
FIG. 8 is the measured power supply rejection ratio of the LDO of FIG. 3 with an off-chip capacitor.
Figure 9:
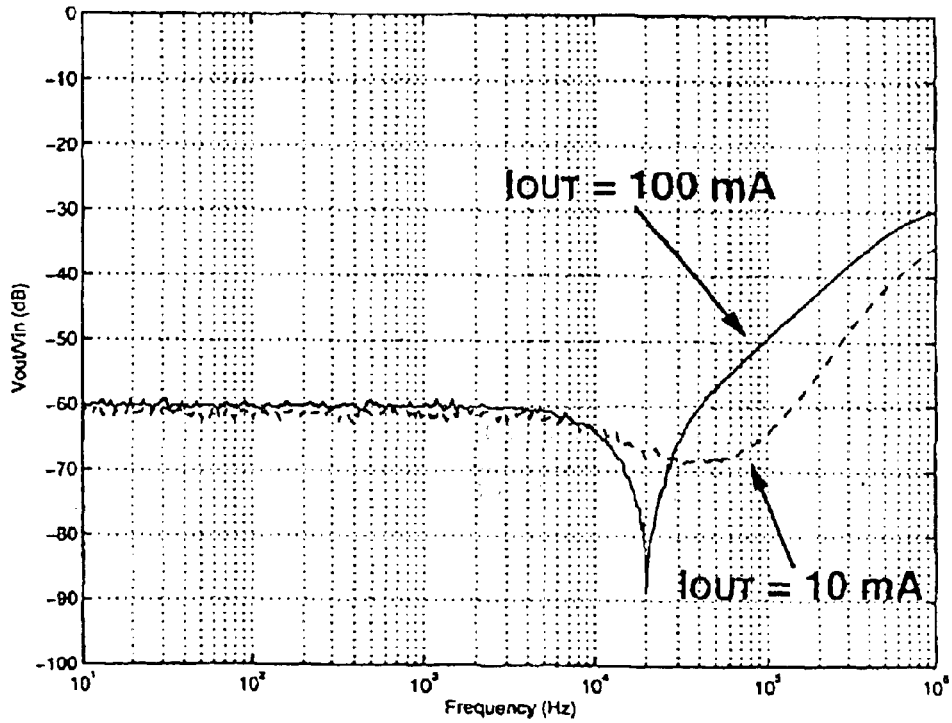
FIG. 9 is the measured power supply rejection ratio of the LDO of FIG. 3 without an off-chip capacitor.
Figure 10:
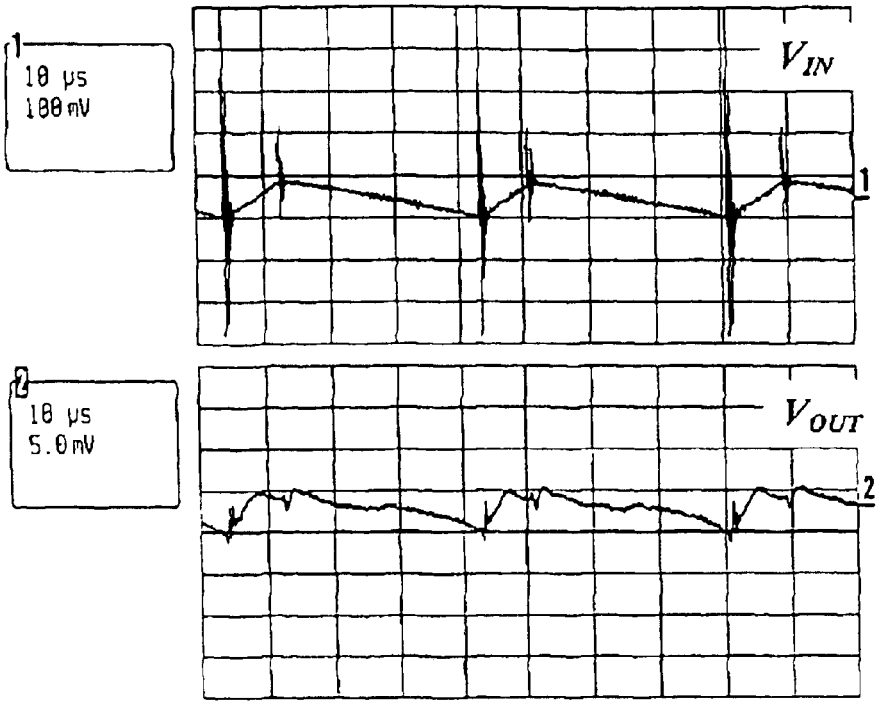
FIG. 10 is the measured ripple rejection of the LDO of FIG. 3.

FIG. 3 is a detailed circuit diagram at a transistor level of one possible realization of the LDO according to the embodiment of the invention as shown in FIG. 2. A LDO in accordance with this embodiment of invention has been fabricated. The measured load transient responses are shown in FIG. 6 and FIG. 7, and the power supply rejection ratios are shown in FIG. 8 and FIG. 9. From the results, the LDO according to this embodiment of the invention is absolutely stable and provides fast responses. Moreover, FIG. 10 shows the good ripple rejection of the LDO according to the embodiment of the invention.

Figure 11:
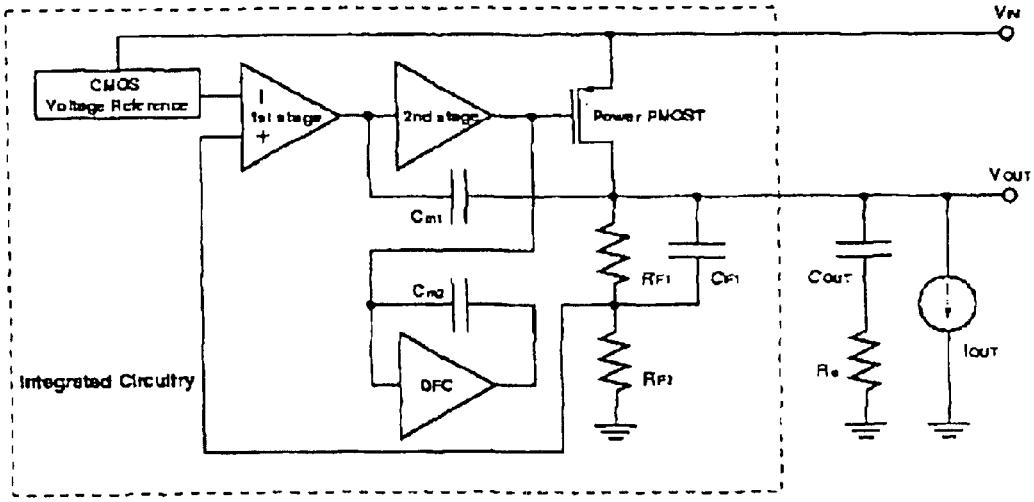
FIG. 11 is a circuit diagram showing a second embodiment of the invention.

It should also be noted that the damping-factor-control means could be connected not only to the output of the first gain stage, but also to the output of the second gain stage. FIG. 11 is a circuit diagram showing this second possibility with the damping factor control connected to the output of the second gain stage.

At least in preferred embodiments, the present invention solves stability problem of LDO design and makes system-on-chip possible by providing stable operation and fast dynamic responses either with or without an off-chip capacitor. The structure and the corresponding schematic of the LDO invention are illustrated in FIG. 2 and FIG. 3, respectively. It will be seen that the generic structure of an error amplifier with a voltage buffer is no longer used. Instead, an error amplifier as the first-stage with a high-gain second-stage amplifier is utilized, and this provides a high voltage gain for a high-precision regulated output voltage. Moreover, the power p-type MOS transistor can operate in either triode or saturation region, and the chip area can thus be reduced. The stability of the invention is achieved by considering the LDO as a three-stage high-gain amplifier with damping-factor-control frequency compensation using a technique, for example, such as that described in U.S. Pat. No. 6,208,206 and disclosed in K. N. Leung, P. K. T. Mok, W. H. Ki and J. K. O. Sin, "Three-Stage Large Capacitive Load Amplifier with Damping-Factor-Control Frequency Compensation," IEEE Journal of Solid-State Circuits, vol. 35, no. 2, pp.221–230, February 2000. The use of the compensation scheme described in U.S. Pat. No. 6,208,206 with the addition of a first-order high-pass feedback network achieves the stability of LDO and fast dynamic responses. The voltage reference may be any circuitry that can provide a stable voltage insensitive to supply voltage and temperature. An example of such a circuit is described in U.S. Pat. No. 6,441,680.

With this structure, the LDO is absolutely stable either with or without the output capacitor. Moreover, the required internal compensation capacitors are small and can be easily integrated in any standard CMOS technology. The small compensation capacitors speed up the transient response as well. The wide bandwidth of the LDO provides a good power supply rejection ratio to reject high-frequency noise from voltage supply, and the LDO serves well as a post regulator for switching-mode power converters. The measured load transient responses and the power supply rejection ratios show that the LDO is absolutely stable and provides fast responses. Moreover, the good ripple rejection of the LDO shows the post-regulation ability of the LDO.

An example of the present invention has been described above but it will be understood that a number of variations may be made to the circuit design without departing from the spirit and scope of the present invention. At least in its preferred forms the present invention provides a significant departure from the prior art both conceptually and structurally. While a particular embodiment of the present invention has been described, it is understood that various alternatives, modifications and substitutions can be made without departing from the concept of the present invention. Moreover, the present invention is disclosed in CMOS implementation but the present invention is not limited to any particular integrated-circuit technology and also discrete-component implementation.

The invention claimed is:

1. A low-dropout regulator comprising:

a high-gain error amplifier having a differential input stage and a single-ended output a high-swing high-positive-gain second stage with input connecting to the output of the error amplifier and a single-ended output a p-type MOS transistor with gate terminal connecting to the output of the second stage, source terminal connecting to the supply voltage, and drain terminal to the output of the low-dropout regulator a first-order high-pass feedback network connecting to the output of the low-dropout regulator and the positive input of the error amplifier a damping-factor-control means comprising a negative gain stage with a feedback capacitor connecting between the input and output of this gain stage, *wherein the damping-factor-control means is coupled to the error amplifier or to the second stage;* a capacitor connecting between the output of the error amplifier and the output of the low-dropout regulator a voltage reference connecting to the negative input of the error amplifier.

2. A low-dropout regulator as claimed in 1 wherein said the second stage is in common-source configuration.

3. A low-dropout regulator as claimed in 1 wherein said the p-type MOS transistor operates in either linear or saturation region.

4. A low-dropout regulator as claimed in 1 wherein said the first-order high-pass feedback network comprises two resistors connecting in series, one of said resistors being connected between the output of [LDO] *the low-dropout regulator* and the positive input of the error amplifier, and the other said resistor being connected between the positive input of the error amplifier and the ground, and wherein a capacitor is connected between the output of [LDO] *the low-dropout regulator* and the positive input of the error amplifier.

5. A low-dropout regulator as claimed in 4 wherein said the first-order high-pass feedback network creates a left-half-plane zero and a left-half-plane pole.

6. A low-dropout regulator as claimed in 5 wherein said the first-order high-pass feedback network provides that the frequency of the left-half-plane zero is lower than the frequency of the left-half-plane pole.

7. A low-dropout regulator as claimed in 1 wherein said the damping-factor-control means is a gain stage with voltage gain larger than one.

8. A low-dropout regulator as claimed in 1 wherein said the damping-factor-control means includes circuitry to define the output voltage level.

9. A low-dropout regulator as claimed in 1 wherein said the damping-factor-control means includes a high-swing common-source output stage.

10. A low-dropout regulator as claimed in 1 wherein said the damping-factor-control means provides a pole-splitting effect.

11. A low-dropout regulator as claimed in 1 wherein said the damping-factor-control means locates a pole at a low frequency while locating the second and third poles at high frequency.

12. A low-dropout regulator as claimed in 1 wherein said the damping-factor-control means locates the second and third poles at high frequency and the poles can in separate form or complex form.

13. A low-dropout regulator as claimed in 1 wherein said the damping-factor-control means is connected at [the] *an* output of the second gain stage.

14. A low-dropout regulator as claimed in 1 wherein said the low-dropout regulator is stabilized with an off-chip capacitor.

15. A low-dropout regulator as claimed in 1 wherein said the low-dropout regulator is stabilized without an off-chip capacitor.

16. A low-dropout regulator as claimed in 14 wherein said the low-dropout regulator has four poles and two zeros when the off-chip capacitor is connected at the output of the low-dropout regulator.

17. A low-dropout regulator as claimed in 16 wherein said the low-dropout regulator uses the two zeros cancel the effect of the second and third poles while keeping the fourth pole after the unity-gain frequency of the loop gain.

18. A low-dropout regulator as claimed in 15 wherein said low-dropout regulator has two poles and one zero when no off-chip capacitor is connected at the output of the low-dropout regulator.

19. A low-dropout regulator as claimed in 18 wherein said the low-dropout regulator uses the zero to cancel the effect of the second pole.

20. A low-dropout regulator as claimed in 1 wherein said the voltage reference is a circuit that provides a supply- and temperature-independent voltage to define the output voltage of the low-dropout regulator.

21. A low-dropout regulator as claimed in 1 wherein said the low-dropout regulator is implemented in an integrated-circuit technology or discrete-component implementation.

22. A low-dropout regulator comprising a three-stage amplifier formed of (a) a high-gain error amplifier, (b) a high-swing high-positive gain second stage and (c) a p-type MOS transistor the gate terminal of which is connected to [the] *an* output of said second stage, wherein said regulator further comprises damping-factor-control means connected to [the] *an* output of the said error amplifier*, wherein the damping-factor-control means comprises a negative gain stage*.

23. A low-dropout regulator comprising a three-stage amplifier formed of (a) a high-gain error amplifier, (b) a high-swing high-positive gain second stage and (c) a p-type MOS transistor the gate terminal of which is connected to [the] *an* output of said second stage, wherein said regulator further comprises damping-factor-control means connected to the output of the said second stage*, wherein the damping-factor-control means comprises a negative gain stage*.

*24. An integrated circuit, comprising:*

*an error amplifier;*

*a high-swing high-positive-gain stage including an input terminal coupled to an output terminal of the error amplifier;*

*a transistor including a gate terminal coupled to an output terminal of the high-swing high-positive-gain stage; and*

*a damping-factor-control circuit including a negative gain stage and a feedback capacitor, wherein the damping factor-circuit is coupled to the output terminal of the high-swing high-positive gain stage or to the error amplifier.*

*25. The integrated circuit of claim 24, further comprising a voltage reference circuit coupled to a negative input terminal of the error amplifier.*

*26. The integrated circuit of claim 24, further comprising a capacitor disposed between the output terminal of the error amplifier and a regulator output terminal of the integrated circuit.*

*27. The integrated circuit of claim 24, further comprising a first-order high-pass feedback network coupled to a regulator output terminal of the integrated circuit and a positive input terminal of the error amplifier.*

*28. The integrated circuit of claim 28, wherein the first-order high-pass feedback network comprises a first resistor coupled between the regulator output terminal of the integrated circuit and the positive input terminal of the error amplifier and a second resistor coupled between the positive input terminal of the error amplifier and ground, and wherein the integrated circuit further comprises a capacitor disposed between the regulator output terminal and the positive input terminal of the error amplifier.*

*29. The integrated circuit of claim 29, wherein the first-order high-pass feedback network is configured to create a left-half-plane zero and a left-half-plane pole.*

*30. The integrated circuit of claim 30, wherein the first-order high-pass feedback network is configured to provide a frequency of the left-half-plane zero that is lower than a frequency of the left-half-plane pole.*

*31. The integrated circuit of claim 24, wherein the damping-factor-control circuit is coupled to the output terminal of the error amplifier.*

*32. The integrated circuit of claim 24, wherein the damping-factor-control circuit comprises a high-swing common-source output terminal stage.*

*33. The integrated circuit of claim 24, wherein the damping-factor-control circuit is configured to provide a pole-splitting effect.*

*34. An integrated circuit, comprising:*

*an error amplifier;*

*a high-swing high-positive-gain stage including an input terminal coupled to an output terminal of the error amplifier;*

*a transistor including a gate terminal coupled to an output terminal of the high-swing high-positive-gain stage; and*

*a damping-factor-control circuit coupled to the error amplifier or to the high-swing high-positive-gain stage, wherein the damping-factor-control circuit is configured to locate a first pole at a first frequency and to locate a second pole and a third pole at a second frequency higher than the first frequency.*

*35. The integrated circuit of claim 34, wherein the error amplifier comprises a high-gain error amplifier, and wherein the error amplifier comprises a differential-input stage and a single-ended output terminal.*

*36. The integrated circuit of claim 35, wherein the transistor is a p-type transistor, and wherein the p-type transistor is coupled to a regulator output terminal of the integrated circuit.*

*37. The integrated circuit of claim 35, wherein the high-swing high-positive-gain stage comprises a common-source configuration.*

*38. The low-dropout regulator of claim 23, wherein the damping-factor control means further comprises a feedback capacitor coupled to the output of the high-swing high-positive gain second stage.*

* * * * *

UNITED STATES PATENT AND TRADEMARK OFFICE

CERTIFICATE OF CORRECTION

PATENT NO. : RE42,116 E
APPLICATION NO. : 12/425317
DATED : February 8, 2011
INVENTOR(S) : Leung et al.

It is certified that error appears in the above-identified patent and that said Letters Patent is hereby corrected as shown below:

Column 6, line 13, in Claim 2, delete "in 1" and insert -- in claim 1 --.

Column 6, line 15, in Claim 3, delete "in 1" and insert -- in claim 1 --.

Column 6, line 18, in Claim 4, delete "in 1" and insert -- in claim 1 --.

Column 6, line 28, in Claim 5, delete "in 4" and insert -- in claim 4 --.

Column 6, line 31, in Claim 6, delete "in 5" and insert -- in claim 5 --.

Column 6, line 35, in Claim 7, delete "in 1" and insert -- in claim 1 --.

Column 6, line 38, in Claim 8, delete "in 1" and insert -- in claim 1 --.

Column 6, line 41, in Claim 9, delete "in 1" and insert -- in claim 1 --.

Column 6, line 44, in Claim 10, delete "in 1" and insert -- in claim 1 --.

Column 6, line 47, in Claim 11, delete "in 1" and insert -- in claim 1 --.

Column 6, line 51, in Claim 12, delete "in 1" and insert -- in claim 1 --.

Column 6, line 55, in Claim 13, delete "in 1" and insert -- in claim 1 --.

Column 6, line 58, in Claim 14, delete "in 1" and insert -- in claim 1 --.

Column 6, line 61, in Claim 15, delete "in 1" and insert -- in claim 1 --.

Column 6, line 64, in Claim 16, delete "in 14" and insert -- in claim 14 --.

Column 7, line 1, in Claim 17, delete "in 16" and insert -- in claim 16 --.

Column 7, line 5, in Claim 18, delete "in 15" and insert -- in claim 15 --.

Signed and Sealed this
Seventh Day of June, 2011

David J. Kappos

David J. Kappos
*Director of the United States Patent and Trademark Office*

Column 7, line 9, in Claim 19, delete “in 18” and insert -- in claim 18 --.

Column 7, line 12, in Claim 20, delete “in 1” and insert -- in claim 1 --.

Column 7, line 16, in Claim 21, delete “in 1” and insert -- in claim 1 --.

Column 8, line 3, in Claim 28, delete “claim 28,” and insert -- claim 27, --.

Column 8, line 12, in Claim 29, delete “claim 29,” and insert -- claim 28, --.

Column 8, line 15, in Claim 30, delete “claim 30,” and insert -- claim 29, --.

Column 8, line 45, in Claim 36, delete “claim 35,” and insert -- claim 34, --.

Column 8, line 50, in Claim 37, delete “claim 35,” and insert -- claim 34, --.